(12) United States Patent
Kahnt et al.

(10) Patent No.: US 11,239,686 B2
(45) Date of Patent: Feb. 1, 2022

(54) MOTOR VEHICLE

(71) Applicants: HELLA GMBH & CO. KGAA, Lippstadt (DE); LEONI BORDNETZ-SYSTEME GMBH, Kitzingen (DE)

(72) Inventors: Sebastian Kahnt, Karlstadt (DE); Hans Joachim Liebscher, Wuerzburg (DE); Magnus Nigmann, Tauberbischofsheim (DE); Ilja Uljanow, Wuerzburg (DE)

(73) Assignees: HELLA GmbH & Co,. KGaA, Lippstadt (DE); LEONI Bordnetz-Systeme GmbH, Kitzingen (DE)

( * ) Notice: Subject to any disclaimer, the term of this patent is extended or adjusted under 35 U.S.C. 154(b) by 155 days.

(21) Appl. No.: 16/436,075

(22) Filed: Jun. 10, 2019

(65) Prior Publication Data
US 2019/0296572 A1    Sep. 26, 2019

Related U.S. Application Data

(63) Continuation of application No. PCT/EP2017/082104, filed on Dec. 8, 2017.

(30) Foreign Application Priority Data

Dec. 9, 2016 (DE) .......................... 102016224644.5

(51) Int. Cl.
*H02J 7/00* (2006.01)
*H02J 7/34* (2006.01)
(Continued)

(52) U.S. Cl.
CPC ............ *H02J 7/342* (2020.01); *H02J 7/1423* (2013.01); *H02J 50/05* (2016.02); *H02J 50/10* (2016.02);
(Continued)

(58) Field of Classification Search
CPC .......... H02J 7/342; H02J 7/1423; H02J 50/05; H02J 50/10; Y02E 60/10; Y02T 10/70
(Continued)

(56) References Cited

U.S. PATENT DOCUMENTS 6,384,489 B1    5/2002 Bluemel et al.
6,583,519 B2    6/2003 Aberle et al.
(Continued)

FOREIGN PATENT DOCUMENTS

DE    19846319 C1    2/2000
DE    10102243 A1    10/2002
(Continued)

*Primary Examiner* — Zixuan Zhou
(74) *Attorney, Agent, or Firm* — Laurence A. Greenberg; Werner H. Stemer; Ralph E. Locher

(57) ABSTRACT

A motor vehicle, particularly a passenger car, contains an onboard electrical system having a number of electrical consumers, a generator and an onboard electrical system rechargeable battery. A bidirectional interface is provided for a rechargeable device battery of a mobile device such that the rechargeable device battery can be coupled to the onboard electrical system by the bidirectional interface and, when coupled, can both be charged by the onboard electrical system and be used as an additional energy source in the onboard electrical system.

20 Claims, 2 Drawing Sheets

(51) Int. Cl.
*H02J 7/14* (2006.01)
*H02J 50/05* (2016.01)
*H02J 50/10* (2016.01)

(52) U.S. Cl.
CPC ............... *Y02E 60/10* (2013.01); *Y02T 10/70* (2013.01); *Y02T 90/14* (2013.01)

(58) Field of Classification Search
USPC .................................. 320/103, 109; 701/22
See application file for complete search history.

(56) References Cited

U.S. PATENT DOCUMENTS

| | | |
|---|---|---|
| 7,420,352 B2 | 9/2008 | Kranz |
| 9,150,170 B2 | 10/2015 | Pischke et al. |
| 9,266,439 B2 | 2/2016 | Wanke et al. |
| 2002/0196001 A1 | 12/2002 | Morgen |
| 2004/0222767 A1* | 11/2004 | Ohkouchi ............... B60L 1/003 318/801 |
| 2012/0286569 A1* | 11/2012 | Pischke .................... H02J 1/08 307/10.1 |
| 2015/0042161 A1* | 2/2015 | Proebstle .............. H02J 7/1423 307/10.6 |
| 2016/0031506 A1* | 2/2016 | Lloyd .................... B60L 53/68 701/49 |
| 2018/0105054 A1* | 4/2018 | Fan ....................... B60L 53/126 |

FOREIGN PATENT DOCUMENTS

| | | |
|---|---|---|
| DE | 10129789 C1 | 11/2002 |
| DE | 10318494 A1 | 11/2004 |
| DE | 102009032084 A1 | 1/2011 |
| DE | 102009028147 A1 | 2/2011 |
| DE | 102009052769 A1 | 6/2011 |
| DE | 102011017008 A1 | 10/2012 |
| DE | 102014216783 A1 | 2/2016 |
| EP | 1174976 A1 | 1/2001 |

\* cited by examiner

MOTOR VEHICLE

CROSS-REFERENCE TO RELATED APPLICATION

This is a continuation application, under 35 U.S.C. § 120, of copending international application No. PCT/EP2017/082104, filed Dec. 8, 2017, which designated the United States; this application also claims the priority, under 35 U.S.C. § 119, of German patent application No. DE 10 2016 224 644.5, filed Dec. 9, 2016; the prior applications are herewith incorporated by reference in their entireties.

BACKGROUND OF THE INVENTION

Field of the Invention

The invention relates to a motor vehicle, in particular to a passenger car, containing an onboard electrical system with a number of electrical consumers, with a generator and with an onboard electrical system rechargeable battery.

Mini-vehicles, such as for example pedal scooters, mini-folding scooters or kickboards have recently become significantly more widespread. In this context, corresponding mini-vehicles are used not only within the scope of a sporting activity, but also for individual transportation in urban areas. Accordingly, such mini-vehicles are also used, in particular, for what is referred to as the last-mile, that is to say for the journey from the parking location of a motor vehicle to the actual destination and back.

In this context mini-vehicles, in particular mini-vehicles of the type mentioned above, are being increasingly developed which are equipped with an electric motor and a rechargeable battery, that is to say are designed for an electric travel mode.

SUMMARY OF THE INVENTION

Taking the above as a basis, the invention is based on the object of improving the usability of mini-vehicles with an electric motor and rechargeable battery for what is referred to as the last-mile.

A corresponding motor vehicle is configured here, in particular, as what is referred to as a passenger car and contains an onboard electrical system, typically a direct voltage onboard electrical system, with at least one generator, with at least one on-board electrical system rechargeable battery and with a number of electrical consumers. In this context, the generator, that is to say the at least one generator, is typically embodied as what is referred to as a dynamo, and the onboard electrical system rechargeable battery, that is to say the at least one onboard electrical system rechargeable battery, is preferably embodied as a starter battery and correspondingly not as a drive battery or traction battery. In addition, the motor vehicle has a bidirectional interface for at least one device rechargeable battery of a mobile device, which is part of the onboard electrical system of the motor vehicle, in particular at least in some operating situations.

The bidirectional interface and typically the entire onboard electrical system is or are typically configured in such a way that the device rechargeable battery, that is to say the at least one device rechargeable battery, can be coupled to the onboard electrical system via the bidirectional interface, and in the coupled state, typically depending on the operating situation or operating mode, can, on the one hand, be charged by the onboard electrical system and, on the other hand, can be used as an additional energy source in the onboard electrical system, that is to say in addition to the onboard electrical system rechargeable battery. In other words, in the coupled state the device rechargeable battery is used as an energy source in the onboard electrical system of the motor vehicle in at least one operating situation or in one operating mode and accordingly does not act exclusively as a load which is supplied with electrical energy via the onboard electrical system. Such a use of the device rechargeable battery in which, for example, the battery is used as an additional energy buffer in the vehicle electrical system is particularly advantageous here if operating states occur in the motor vehicle in which there are brief power peaks, that is to say in which either large quantities of electrical energy are generated in the short term or in which large quantities of energy are required in the short term, since such power peaks can then be distributed among a plurality of rechargeable batteries, that is to say, in particular, the onboard electrical system rechargeable battery and the device rechargeable battery. A corresponding operating mode is implemented here, for example, via a suitably configured control unit in the onboard electrical system, and accordingly the onboard electrical system preferably has such a control unit.

Such bidirectional integration of the device rechargeable battery, which is to say of an additional energy accumulator, into the onboard electrical system of the motor vehicle permits intelligent distribution of energy in the onboard electrical system to be achieved. It is therefore possible, for example, depending on the demand and/or depending on the operating situation or operating mode, to use the recuperation power of the motor vehicle, that is to say in particular the recuperation power of the generator, to charge the device rechargeable battery or else to draw energy from the device rechargeable battery in order to make available additional electrical power during short-term load peaks, e.g. for boosting. The term boosting refers here usually to the use of the device rechargeable battery as an additional energy source and, in particular, the parallel use of the onboard electrical system rechargeable battery and of the device rechargeable battery, for example, to make available relatively high electrical power levels and therefore, for example, to cover peaks in the power demand. The generation of electrical power by means of the generator and/or further generators, in particular for charging the onboard electrical system rechargeable battery and/or the device rechargeable battery in turn is usually referred to as recuperation. The additional bidirectionally integrated energy accumulator, that is to say the device rechargeable battery is gradually recharged here in a typical operation, but is in this context however not only constantly charged but also in the meantime also repeatedly used for supplying (e.g. boosting) and in the process is partially discharged again.

The integration of the device rechargeable battery can be implemented at different voltage levels here and preferably occurs as 12 V or 48 V. By integrating the mobile device or directly integrating the device rechargeable battery with good contacts, it is additionally possible for a relatively high current flow across the bidirectional interface, as a result of which the required charging time for charging the device rechargeable battery can be considerably reduced.

If it can also be assumed that the mobile device with the device rechargeable battery or at least the device rechargeable battery is in most cases located in the motor vehicle during travel and the device rechargeable battery is connected to the onboard electrical system via the bidirectional interface, the capacity of the onboard electrical system rechargeable battery of the motor vehicle can be reduced by approximately the capacity of the additional energy accumulator.

However, it is also necessary then to consider that the onboard electrical system of the motor vehicle has to continue to remain functionally capable if the device rechargeable battery is currently not integrated into the vehicle electrical system. The functional capability does not necessarily have to continue to be ensured in its full scope but at least the operational capability of the safety-relevant functions must be ensured. That is to say the capacity of the onboard electrical system rechargeable battery of the motor vehicle cannot be reduced randomly and the device rechargeable battery cannot make a randomly large contribution to the overall capacity. Therefore, the device rechargeable battery contributes, or if a plurality of device rechargeable batteries are provided, the device rechargeable batteries preferably contribute at maximum 75% of the overall capacity of all the rechargeable batteries which are installed and/or can be used and/or employed in the motor vehicle and correspondingly the onboard electrical system rechargeable battery, or if there are a plurality of onboard electrical system rechargeable batteries installed permanently in the motor vehicle, the onboard electrical system rechargeable batteries, contribute at least 25% to the overall capacity. Furthermore, the device rechargeable battery contributes, or the device rechargeable batteries contribute, a maximum of 50% of the overall capacity.

Since a corresponding reduction in the capacity of the onboard electrical system rechargeable battery, or of the onboard electrical system rechargeable batteries, in principle entails various advantages, such as, for example, a relatively low weight, it is also advantageous if the device rechargeable battery or the device rechargeable batteries contributes/contribute at least 20%, more preferably at least 35% and in particular at least 50% of the overall capacity.

In this context, an overall capacity between 10 Ah and 20 Ah is to be currently assumed, that is to say motor vehicles which are manufactured at present according to the prior art are equipped at least in the field of passenger cars with an onboard electrical system rechargeable battery whose capacity is in the range of 10 Ah to 20 Ah, or that two or more electrical system rechargeable batteries are employed, the overall capacity of which is in the range of 10 Ah to 20 Ah. Furthermore, typical device rechargeable batteries, which is to say for example the rechargeable battery of a so-called E bike or a so-called scooter, typically have a capacity in the range of 3 Ah to 11 Ah.

Taking the above as a basis, various ways of apportioning can then be implemented, by means of which an envisaged overall capacity for a motor vehicle is achieved. Therefore, if, for example, an overall capacity of 20 Ah, with a bidirectional interface and a mobile device with a device rechargeable battery of 3 Ah is envisaged for a motor vehicle of a specific motor vehicle class, a specific model range or a specific type of motor vehicle or a specific motor vehicle model according to the concept presented here, an onboard electrical rechargeable battery with a capacity of 17 Ah is used or installed in this motor vehicle so that the envisaged overall capacity of 20 Ah is obtained. The overall capacity of 20 Ah which is envisaged in this exemplary embodiment corresponds here to the capacity of an onboard electrical rechargeable battery such as is installed according to the prior art in a motor vehicle of the corresponding motor vehicle class, the corresponding model range, of the corresponding type of motor vehicle or the corresponding motor vehicle model and the electrical system rechargeable battery which is installed according to the concept presented here is then reduced with respect to the capacity by 3 Ah in comparison therewith.

The term motor vehicle class, referred to for short as vehicle class or alternatively vehicle segment, is typically used for a group of motor vehicles (various manufacturers) which are comparable, in particular, in terms of their design and their size (e.g. Audi A6, BMW 5 series, Mercedes E-class, etc.). The division into various motor vehicle classes and the designation of the motor vehicle classes (compact class, middle range class, luxury class . . . ) and/or the assignment of motor vehicles to the motor vehicle classes (e.g. Audi A6, BMW 5 series, Mercedes E-class etc. to the luxury class) is made here by various institutions, for example the German Federal Motor Transport Authority (Deutsche Kraftfahrt-Bundesamt) or the EU Commission, in different ways. Furthermore, the term motor vehicle model is typically used for motor vehicles of a manufacturer which are very similar in terms of their design, size and appearance and/or in which the same floor assembly or the same designation is used (e.g. C-class in the case of Mercedes). The various models of a manufacturer are typically assigned to various motor vehicle classes here. A corresponding motor vehicle model is also typically produced over a production cycle and then replaced by what is referred to as a successor model which is offered with the same (model) designation. The motor vehicle model of a specific production cycle is typically designated a model range (e.g. W204 in the case of Mercedes). Finally, the term type of motor vehicle designates a vehicle of a model range with specific motorization (motor vehicles of a specific type of motor vehicle, type or vehicle type generally have the same key number or KBA number).

Further examples of expedient ways of apportioning are specified in the following table, wherein in each case the overall capacity which is envisaged for the motor vehicle is achieved by at least one onboard electrical system rechargeable battery and at least one device rechargeable battery:

| Overall capacity | Capacity device rechargeable battery | Capacity onboard electrical system rechargeable battery |
| --- | --- | --- |
| 20 Ah | 5 Ah | 15 Ah |
| 20 Ah | 6 Ah | 14 Ah |
| 20 Ah | 5Ah + 5Ah (2 device rechargeable batteries) | 10 Ah |
| 20 Ah | 10 Ah | 10 Ah |
| 20 Ah | 5Ah + 5Ah (2 device rechargeable batteries) | 5Ah + 5Ah (2 onboard electrical system rechargeable batteries) |
| 10 Ah | 3 Ah | 7 Ah |
| 10 Ah | 5 Ah | 5 Ah |

Since corresponding mobile devices, corresponding device rechargeable batteries and/or the bidirectional interface constitute an optional equipment feature for a motor vehicle in some cases, corresponding reduction of the capacity of the onboard electrical system rechargeable battery or of the onboard electrical system rechargeable batteries is preferably not implemented in every motor vehicle of a specific motor vehicle class, of a specific model range, of a specific type of motor vehicle or of a specific motor vehicle model. Instead, expediently only those motor vehicles of a specific motor vehicle class, of a specific model range, of a specific type of motor vehicle or of a specific motor vehicle model have an onboard electrical system rechargeable battery or onboard electrical system rechargeable batteries which have a reduced capacity and also have a corresponding (functionally capable or functionally ready) bidirectional interface and/or are equipped with device rechargeable batteries. In a specific motor vehicle class, a specific model range, a specific type of motor vehicle (motor vehicles of a specific type or vehicle type generally have the same key number of KBA number and typically have the same engine) or a specific motor vehicle model typically has a number of motor vehicles which differ in terms of the capacity of the respective onboard electrical system rechargeable battery or the respective onboard electrical system rechargeable batteries, specifically depending on whether a corresponding (functionally capable or functionally ready) bidirectional interface is present and how many mobile devices and therefore how many device rechargeable batteries can be coupled to the onboard electrical system.

As a result, for example a number of motor vehicles of a specific motor vehicle class, of a specific model range, of a specific type of motor vehicle or of a specific motor vehicle model have an onboard electrical system rechargeable battery or a plurality of onboard electrical system rechargeable batteries which together have a capacity of, for example, 20 Ah. This then corresponds to the envisaged overall capacity and the corresponding motor vehicles do not have a (functionally capable or functionally ready) bidirectional interface (in this context a bidirectional interface is installed by hardware technology in some cases, but the interface is then not functionally capable, that is to say is, for example, deactivated) and correspondingly a device rechargeable battery cannot be connected to the respective electrical system either. Other motor vehicles of this specific motor vehicle class, this specific model range of this specific type of motor vehicle or this specific motor vehicle model which in contrast have a corresponding (functionally capable or functionally ready) bidirectional interface then have an onboard electrical system rechargeable battery or a plurality of onboard electrical system rechargeable batteries with a reduced capacity, in particular corresponding to the table, that is to say for example with a capacity of 17 Ah, 15 Ah or 10 Ah. In these cases, the capacity of the onboard electrical system rechargeable battery or of the onboard electrical system rechargeable batteries is then obtained together with the capacity of the mobile device which is associated with the corresponding motor vehicle and the device rechargeable battery thereof or together with the device rechargeable batteries insofar as, for example, two are provided, again the envisaged overall capacity of, in this example, 20 Ah. That is to say motor vehicles of a (production) batch are also equipped with different onboard electrical system rechargeable batteries, wherein the onboard electrical system rechargeable batteries differ in terms of their capacity. Alternatively, the motor vehicles of the batch are equipped with different numbers of electrical system rechargeable batteries.

The bidirectional interface or at least one electrical or electronic coupling element of the bidirectional interface is embodied here, for example, by a simple switch or a switching unit, for example formed by two semiconductor switches which are connected in anti-serial fashion and which switch or switching unit connects the onboard electrical system rechargeable battery and the device rechargeable battery to one another. The switch or the switching unit is typically embodied here as a controllable switch or as a controllable switching unit and has here, for example, a relay or one or more anti-serial semiconductor switches.

In addition, the bidirectional interface additionally typically has a mechanical coupling element which is expediently embodied as a plug-type connector. Such a plug-type connector is also preferably embodied here as a magnetic plug-type connection or magnetically guided plug-type connection, such as is described, for example, in published, non-prosecuted German patent DE 10 2014 216 783 A1.

Alternatively or additionally, a direct voltage converter, referred to for short as DC/DC converter, forms the electrical or electronic coupling element of the bidirectional interface, which element is configured, in particular, for transferring high power levels and/or high currents. With a direct voltage converter it is possible to eliminate or bring about virtually any desired voltage difference, and the rechargeable batteries can therefore relatively easily also be operated in different states of charge (e.g. the device rechargeable battery is fully charged even though the onboard electrical system rechargeable battery or the onboard electrical system rechargeable batteries is/are at 70% of the state of charge).

According to a further embodiment variant, a bypass is added to the direct voltage converter. In this case, the electrical or electronic coupling element of the bidirectional interface is formed, for example, by a coupling circuit in which a direct voltage converter, for example a buck converter, a buck-boost converter, a monodirectional (configured for one direction) direct voltage converter or a bidirectional direct voltage converter is connected in parallel to a switch which forms the bypass or a switching unit which forms the bypass and which is embodied, in particular, as a controllable switching unit and has, for example, a relay or one or more antiserial semiconductor switches, for example two MOSFETs which are connected in antiserial fashion. The bypass is therefore embodied, for example, solely by a conductor connection with two semiconductor switches.

This has the advantage that, for example in the case of balanced states of charge, the power level for recuperation/boosting does not have to be driven by the direct voltage converter but rather can be conducted via the bypass. In this way, the power loss can be reduced and there is the possibility of using a more simple direct voltage converter. Therefore, the direct voltage converter is then preferably configured for a relatively low maximum power level, and the power level of the DC/DC converter is therefore preferably reduced, for example, from 3 kW to 500 W. The direct voltage converter therefore preferably has a maximum power level which is less than or equal to approximately 1 kW and more preferably less than or equal to approximately 500 W, in particular in the case of a voltage level of 48 V. Furthermore, the direct voltage converter and the bypass are preferably configured for different electrical power levels and/or current loads or current-carrying capacities, and typically relatively high electrical power levels which are to be transmitted are then preferably transmitted via the bypass. The bypass is then configured, for example, for a maximum current strength of approximately 100 A, but, in particular, at least higher than 80 A, and the direct voltage converter is configured for a maximum current which is less than approximately 80 A and, in particular, less than approximately 60 A.

The switch which forms the bypass or the switch unit which forms the bypass and/or the DC/DC converter are/is also embodied so as to be expediently controllable, wherein the control is carried out, in particular, by the abovementioned control unit which is configured for this purpose. In this context, the control is typically carried out as a function of the operating situation and/or as a function of the electrical power to be transmitted and/or as a function of the magnitude of the current to be transmitted and/or as a function of the potential difference between the two component systems which are connected to one another via the electrical or electronic coupling element. Alternatively, at least the direct voltage converter is embodied in such a way that the current can flow only in one direction, that is to say for example across the direct voltage converter to the device rechargeable battery (via the bypass, at least insofar as it is closed, while in contrast preferably both the (recuperation) currents to the device rechargeable battery and the (boost) currents to the onboard electrical system rechargeable battery flow via the bypass). In this case, the direct voltage converter is then preferably configured as a monodirectional direct voltage converter.

If the switching, in particular by the control unit, also occurs, or solely occurs, as a function of the difference in potential, the latter is, for example, sensed as a voltage across the bypass when the switch is opened or when the switching unit is opened or as a difference in potential across the direct voltage converter. If the sensed voltage or difference in potential is then higher than 2 V, for example in the case of a predefined onboard electrical system voltage of 48 V, the switch or the switching unit remains in the opened state or is changed into the opened state, so that current cannot flow across the bypass. If the sensed voltage or difference in potential is, on the other hand, lower than 2 V, the switch or the switching unit remains in the closed state or is changed into the closed state, so that the current flows essentially via the bypass. That is to say that, for example when the switch is opened or the switching unit is opened, in other words when a voltage >2 V is sensed, the direct voltage converter is used to eliminate this sensed voltage so that finally the bypass can be closed, or to strengthen this sensed voltage in order, for example, to recharge an E-bike in order to increase its range.

However, a corresponding switching over process, in particular by means of the control unit between current flow via the direct voltage converter and current flow via the bypass does not necessarily have to take place in the manner of a "hard" switchover process, and instead in some cases a concept is implemented with an overlapping range. If it is then assumed that there is a motor vehicle with a 48 V onboard electrical system, the voltage level in the onboard electrical system will fluctuate, for example, between 46 V and 50 V depending on the state of charge of the battery. Furthermore, if a "last-mile vehicle", that is to say a mobile device or secondary vehicle, with a device rechargeable battery with the same voltage level can be connected to the onboard electrical system, such that in particular three cases or operating situations can be differentiated: in the first case the device rechargeable battery of the "last-mile vehicle" is charged less strongly than the onboard electrical system rechargeable battery of the motor vehicle. In the second case, the two rechargeable batteries, that is to say the onboard electrical system rechargeable battery and the device rechargeable battery, are charged with similar strength and in the third case the device rechargeable battery of the "last-mile vehicle" is charged more strongly than the onboard electrical system rechargeable battery.

If the mobile device, that is to say the "last-mile vehicle" is coupled again to the onboard electrical system after use, it is to be assumed that the device rechargeable battery of the "last-mile vehicle" is discharged. Therefore, firstly the direct voltage or DC/DC converter is used in order to use energy from the onboard electrical system of the motor vehicle in a controlled fashion, in order to charge the "last-mile vehicle". The charging causes the voltage of the device rechargeable battery to rise.

After some time, the time varies depending on the device rechargeable battery and the converter power of the DC/DC converter, the voltages of the onboard electrical system rechargeable battery and device rechargeable battery have approximated to one another. The bypass is then closed, so that the DC/DC converter is bypassed and no energy is transferred via the latter any more. Typical DC/DC converters then go into a sleep mode. However, dedicated switching off by actuating the DC/DC converter is preferred.

If it can then be predicted that the "last-mile vehicle" will be used shortly, for example owing to information from a navigation system, it is appropriate and provided that said "last-mile vehicle" is no longer used as a power generator and is, as it were, fully charged "as far as it will go". For this purpose, the DC/DC converter is activated again and the bypass is opened. The "last-mile vehicle" is subsequently charged up to its maximum voltage and no energy is used any more from the "last-mile vehicle" for consumers in the motor vehicle. The control unit is therefore, for example, configured in such a way that, for example during given route planning, the DC/DC converter is activated again, for example, starting from a residual distance to the destination of 5 km, and the bypass is opened again, and the "last-mile vehicle" is subsequently charged up to its maximum voltage, and no energy is used any more from the "last-mile vehicle" for consumers in the motor vehicle.

The switching over strategy between the direct voltage converter operation and bypass operation is typically always the same in its sequence, but the switching over times are, for example, selected as a function of the cell technology used and the configuration of the hardware and are preferably stored in the control unit, for example in the memory or by programming. As soon as the bypass is closed, a large amount of current flows in an uncontrolled fashion from the higher voltage to the lower voltage. This current is dependent on the difference in voltage and is therefore usually defined by the difference in the state of charge at the switching time, the electrical quality of the connection and the electrical characteristic of the cells of the rechargeable batteries, in particular in the case of lithium-ion rechargeable batteries. The times are therefore defined taking into account these aspects.

In the event of the device rechargeable battery being charged to a greater extent than the onboard electrical system rechargeable battery, and in addition the secondary vehicle not being used shortly, the DC/DC converter is used to transfer energy in the opposite direction, that is to say from the secondary vehicle to the onboard electrical system or onboard electrical system rechargeable battery. The "last-mile vehicle" or rather the device rechargeable battery is adapted here in a controlled fashion to the voltage of the rest of the onboard electrical system of the motor vehicle. Alternatively, in particular if the DC/DC converter is configured for just one direction, the bypass is also directly closed and uncontrolled adaptation of the voltage is made possible. In this context, large currents can then occur and it is ensured that all the components are configured for them.

Irrespective of the precise configuration, the bidirectional interface and, in particular, the electrical or electronic coupling element of the bidirectional interface are preferably embodied for a high current-carrying capacity here. That is to say preferably electrical power levels with currents in the range of 50 A to 100 A (a single mechanical coupling element, that is to say for example a single socket, can also be configured here for approximately 50 A or less and a plurality of these individual mechanical coupling elements can be provided) can be transmitted via the bidirectional interface or at least the electrical or electronic coupling element of the bidirectional interface or fed into the bidirectional interface.

It is also advantageous if the motor vehicle has a specific receptacle for the device rechargeable battery and/or the mobile device, that is to say a receptacle which is specifically adapted to the device rechargeable battery and/or the mobile device. If the corresponding receptacle is configured here for the device rechargeable battery, the receptacle is embodied, for example, as a receptacle cradle or as a receptacle shaft into which the device rechargeable battery is placed, inserted or plugged for coupling to the onboard electrical system. The electrical connection to the onboard electrical system is made here either already by the positioning of the device rechargeable battery in the corresponding receptacle, that is to say by means of contact or by means of capacitive and/or inductive coupling, or else by means of an additional connection, typically a plug-type connection, for example using a connecting cable.

As an alternative to this, the device rechargeable battery remains in the corresponding mobile device and is coupled in this state to the onboard electrical system. Accordingly, the specific receptacle is then adapted to the mobile device and configured, for example, as a holding device in the trunk, as a drawer in a bumper of the motor vehicle, in the manner of a roof-mounted carrier or rear-mounted carrier. In such a case, the electrical connection of the device rechargeable battery to the onboard electrical system via a cable connection is particularly expedient. The corresponding cable is embodied here, for example, as part of the device rechargeable battery or of the mobile device, part of the bidirectional interface or else as a separate cable, that is to say a type of extension cable.

The mobile device is in turn advantageously embodied as a secondary vehicle or "last-mile vehicle" with an electric motor with which, for example, the last-mile from the parking location of the motor vehicle to the actual destination and back is travelled. The secondary vehicle is configured here, in particular, as a single-person vehicle and forms, in particular, what is referred to as an electric longboard, a so-called kickboard, a so-called scooter, a so-called electric scooter, a so-called pedal scooter, a so-called folding miniscooter, a so-called Pedelec or a so-called E-bike. Corresponding secondary vehicles can typically be accommodated without difficulty in a motor vehicle or can be attached to a motor vehicle by a carrier and additionally have a device rechargeable battery whose power data can be compared with rechargeable batteries which are typically installed in a motor vehicle.

Furthermore, a configuration of the bidirectional interface in which the latter has a plug-type connector which is embodied, in particular, as a socket and is arranged, for example, in the trunk of the motor vehicle is expedient. The plug-type connector forms here, as it were, a mechanical coupling element and is also preferably part of a plug-type connection, in particular of a magnetic plug-type connection or magnetically guided plug-type connection, such as is described, for example, in published, non-prosecuted German patent application DE 10 2014 216 783 A1. Alternatively, the bidirectional interface is configured for contactless coupling of the device rechargeable battery, which is to say for inductive and/or capacitive coupling.

In addition, a configuration of the bidirectional interface in which the latter is embodied for an operating voltage higher than 20 V and, in particular, higher than 40 V, that is to say typically 48 V and is correspondingly used in an onboard electrical system with such an operating voltage, is advantageous. In addition it is expedient if the bidirectional interface is embodied for an operating voltage lower than 100 V and, in particular, lower than 60 V. Furthermore, a configuration of the bidirectional interface in which the latter is embodied for charging and discharging current for the device rechargeable battery of approximately 50 A to 100 A is efficient.

Furthermore, depending on the application case it is expedient if the bidirectional interface is embodied for coupling a plurality of device rechargeable batteries and/or if the motor vehicle has a plurality of corresponding bidirectional interfaces. When there is a plurality of bidirectional interfaces, for example one is arranged in the trunk of the motor vehicle and one in a drawer in a bumper of the motor vehicle.

As already mentioned above, there is provision that a corresponding device rechargeable battery in the coupled state does not serve exclusively as a load but rather also as an energy source in the onboard electrical system or for the onboard electrical system in at least one operating situation, one operating mode or one operating state. Therefore, it is advantageous if the onboard electrical system rechargeable battery and the device rechargeable batteries which can be coupled by the bidirectional interface form a rechargeable battery system with an overall capacity which is adapted, in particular, to the motor vehicle and the onboard electrical system thereof and is configured for the system. That is to say, therefore, that, for example, the onboard electrical system rechargeable battery is configured to be somewhat smaller and weaker than is customary, since the device rechargeable battery is typically available in addition and can therefore compensate for a relatively low capacity.

Depending on the configuration variant, the overall capacity of the rechargeable battery system is higher than 5 Ah and, in particular, higher than 10 Ah here. In addition, the overall capacity is typically lower than 40 Ah and, in particular, lower than 30 Ah.

In this context the ratio of the capacity of the onboard electrical system rechargeable battery to the overall capacity is preferably higher than 0.3 and, in particular, higher than 0.4. In addition, the ratio of the capacity of the onboard electrical system rechargeable battery to the overall capacity is preferably lower than 0.8 and, in particular, lower than 0.6.

In every case, the onboard electrical system rechargeable battery is preferably configured here in such a way that the motor vehicle is operationally ready/ready to drive even when there is no device rechargeable battery coupled to the onboard electrical system.

Furthermore, it is expedient if the onboard electrical system of the motor vehicle has, as already stated above, a control unit which is configured to detect coupled device rechargeable batteries and to direct currents into and out of the coupled device rechargeable batteries. The control unit is configured here, in particular, in such a way that in at least one operating mode electrical power is also drawn from the coupled device rechargeable batteries when necessary.

Depending on the configuration of the motor vehicle, the latter also has an electrically driven compressor which forms an electrical consumer in the onboard electrical system of the motor vehicle. A corresponding compressor serves here to compress fresh air for an internal combustion engine, that is to say acts as a type of turbocharger or supercharger, and, owing to the situation, briefly requires relatively high electrical power levels.

Furthermore, in some cases the motor vehicle has at least one active roll stabilizer, which acts as an electrical consumer in the onboard electrical system of the motor vehicle.

Furthermore, the motor vehicle has, depending on the configuration, an onboard electrical system with at least one primary electrical system and one secondary electrical system, wherein the primary electrical system is designed for an operating voltage which is higher than that of the secondary electrical system, and wherein the primary electrical system has the generator, the onboard electrical system rechargeable battery and the bidirectional interface. In this context, the primary electrical system is configured, for example, for an operating voltage of 48 V, and the secondary electrical system for, for example, an operating voltage of 12 V or 24 V. The primary electrical system and the secondary electrical system are preferably connected to one another here via a converter.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are respectively provided with the same reference symbols in all the figures.

Figure 1:
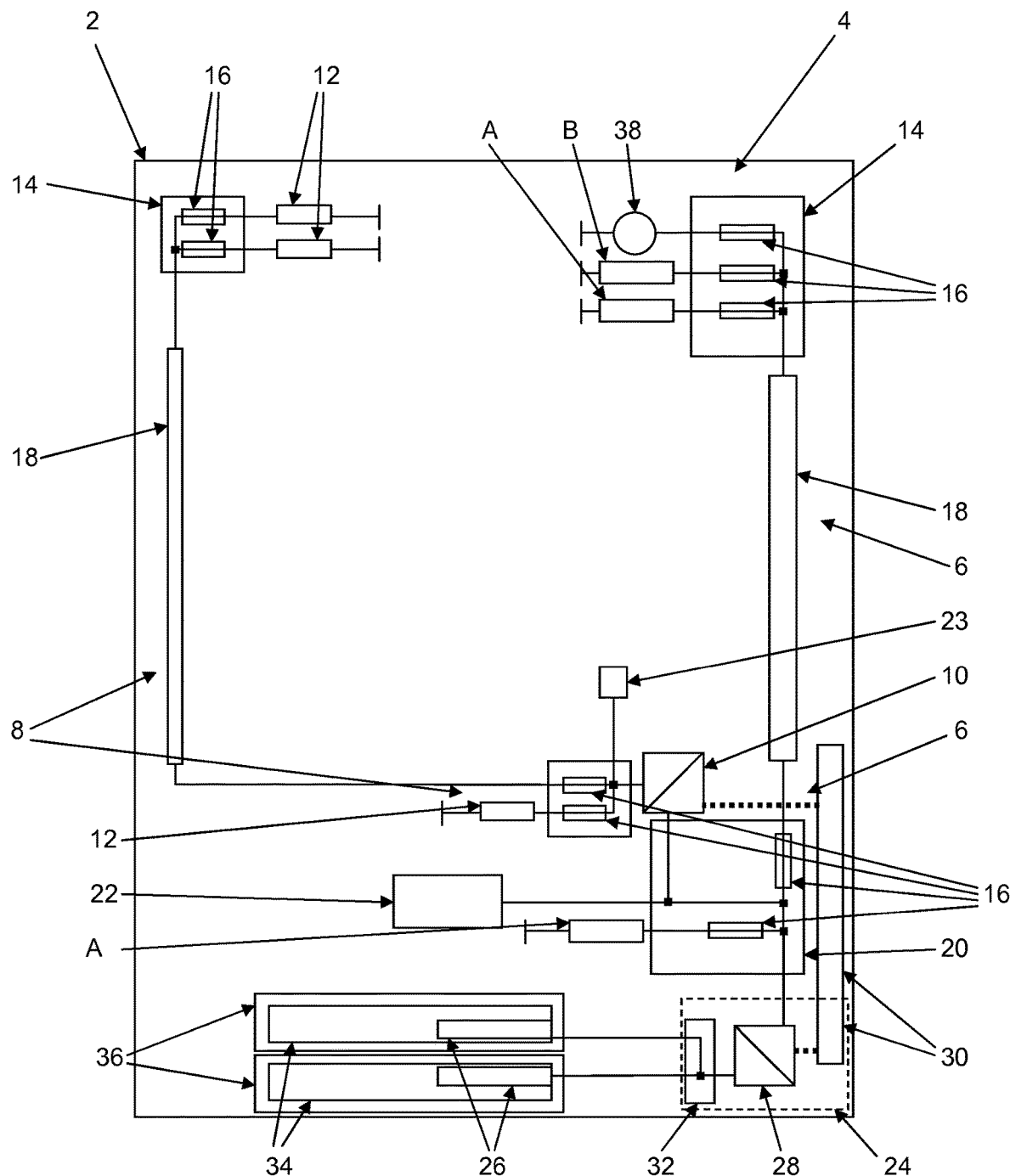
FIG. 1 is a block circuit diagram showing a first embodiment of a motor vehicle with a bidirectional interface for a device rechargeable battery.

The motor vehicle 2 which is described below by way of example and illustrated in FIG. 1 is embodied, for example, as a passenger car and has a direct voltage onboard electrical system 4, referred to below for short as onboard electrical system 4, which is preferably constructed from a primary electrical system 6 and a secondary electrical system 8. In this context, the two partial electrical systems 6, 8, that is to say the primary electrical system 6, on the one hand, and the secondary electrical system 8, on the other, are configured for different operating voltages and connected to one another via an electrical system converter 10. In this context, the primary electrical system 6 in the exemplary embodiment is configured for an operating voltage of 48 V, and the secondary electrical system 8 is configured for an operating voltage of 24 V or alternatively 12 V.

The primary electrical system 6 also has, like the secondary electrical system 8, a plurality of electrical consumers 12 which are connected, typically via so-called distributors 14, into the primary electrical system 6 and/or into the secondary electrical system 8 and therefore into the onboard electrical system 4. In this context, fuses 16, typically so-called safety fuses, which protect the connected electrical consumers 12 against overcurrents, are frequently integrated into the corresponding distributors 14. Corresponding distributors 14 and corresponding electrical consumers 12 are arranged distributed over the entire motor vehicle 2 here, that is to say for example also in the engine compartment and in the region of the rear part of the vehicle. In this context, in the exemplary embodiment, the distributors 14 which are arranged in the engine compartment are connected via so-called underfloor cabling 18 to a main distributor 20 which is positioned in the rear part of the motor vehicle 2.

An onboard electrical system rechargeable battery 22, which, as an energy source and energy accumulator, ensures the supply of the electrical consumers 12, is connected to that main distributor 20 which is part of the primary electrical system 6. The onboard electrical system rechargeable battery 22 is preferably embodied here as a so-called starter battery and is configured for a supply voltage of 48 V. Accordingly, the onboard electrical system rechargeable battery 22 is then preferably not embodied as a drive rechargeable battery. Furthermore, in the exemplary embodiment, the electrical system converter 10 is connected to the main distributor 20 and connected directly to the onboard electrical system rechargeable battery 22. In addition, in the secondary electrical system 8, a 12 V rechargeable battery 23 is also connected as a type of energy buffer to the electrical system converter 10. Such an energy buffer is frequently necessary, since in most designs the electrical system converter 10 is too slow for rapid changes in the power demand.

Furthermore, part of the onboard electrical system 4 is a bidirectional interface 24 via which, in the exemplary embodiment, up to two device rechargeable batteries 26 can be connected into the onboard electrical system 4 or to the onboard electrical system 4. That bidirectional interface 24 contains here in the exemplary embodiment according to FIG. 1 an interface converter 28, to be more precise a direct voltage converter, as an electrical or electronic coupling element, and a control unit 30 which is configured to detect coupled or connected device rechargeable batteries 26 and to direct currents into and out of the coupled device rechargeable batteries 26. The control unit 30 is here in the simplest case embodied by a central control unit 30 for the onboard electrical system 4. Furthermore, the bidirectional interface 24 has, as a mechanical coupling element, a plug-type connector 32 which is embodied in the exemplary embodiment by means of two sockets (not illustrated in more detail) so that in each case one device rechargeable battery 26 can be connected to the onboard electrical system 4 via a socket.

A corresponding device rechargeable battery 26 is typically part of a secondary vehicle 34 with an electric motor, that is to say, for example, part of a so-called electric scooter or an E-bike. Such a secondary vehicle 34 is, in particular, provided as a single-person vehicle for the so-called last-mile, that is to say for travel from the parking location of the motor vehicle 2 to the actual destination, and back if appropriate. Accordingly, such a secondary vehicle 34 is frequently carried along with the motor vehicle 2, and for this reason the motor vehicle 2 has two specific receptacles 36 which are adapted to such a secondary vehicle 34 and in which a corresponding secondary vehicle 34 can be placed and secured. That is to say a corresponding secondary vehicle 34 is firstly positioned in the receptacle 36, provided for that purpose, for example in the trunk of the motor vehicle 2 and locked in place, and in that subsequently the electrical connection to the onboard electrical system 4 is established, for example, using a connecting cable. Alternatively, the electrical connection to the onboard electrical system 4 is achieved solely by the positioning in the receptacle 36, for example using contacts or by capacitive and/or inductive coupling.

If at least one corresponding device rechargeable battery 26 is then coupled to the onboard electrical system 4, this is detected by the control unit 30, and the device rechargeable battery 26 is subsequently used as an electrical energy source in the onboard electrical system 4 in at least one operating mode during the operation of the motor vehicle 2, that is to say, in particular, for supplying electrical consumers 12. A correspondingly connected device rechargeable battery 26 is used here, in particular, to compensate brief load peaks, while in the case of a relatively low power demand in the onboard electrical system 4, the device rechargeable battery 26 is typically charged via the onboard electrical system 4.

Since according to the principle described above load peaks can be compensated using connected device rechargeable batteries 26, the onboard electrical system rechargeable battery 22 tends to be given smaller dimensions than a customary starter battery. That is to say that for the motor vehicle 2 a rechargeable battery system 2 is now preferably predefined which is configured for the currently customary application scenario and has an overall capacity which is suitable for this purpose, that is to say the overall capacity of a customary starter battery. This overall capacity corresponds here in the exemplary embodiment to the currently customary overall capacity of, for example, 20 Ah given an operating voltage or supply voltage of 48 V. Since the two device rechargeable batteries 26 are configured for a supply voltage of 48 V and each have a capacity of 5.5 Ah, the capacity of the onboard electrical system rechargeable battery 22 must, according to the concept presented here with the rechargeable battery system, be merely approximately 9 Ah in order to arrive at an overall capacity of 20 Ah for the rechargeable battery system. Accordingly, the motor vehicle 2 in the exemplary embodiment has an onboard electrical system rechargeable battery 22 with a reduced capacity of 9 Ah.

Furthermore, the onboard electrical system 4 in the exemplary embodiment contains a generator 38, to be more precise what is referred to as a dynamo, an electrically driven compressor B for compressing fresh air for an internal combustion engine of the motor vehicle 2 and in each case an active roll stabilizer A on the front axle and on the rear axle of the motor vehicle 2. The generator 38 used here in the driving mode of the vehicle 2 is at least temporarily to charge the coupled device rechargeable batteries 26, while the electrically driven compressor B and the active roll stabilizers A bring about at least temporarily load peaks in the onboard electrical system 4 in the driving mode of the motor vehicle 2.

Figure 2:
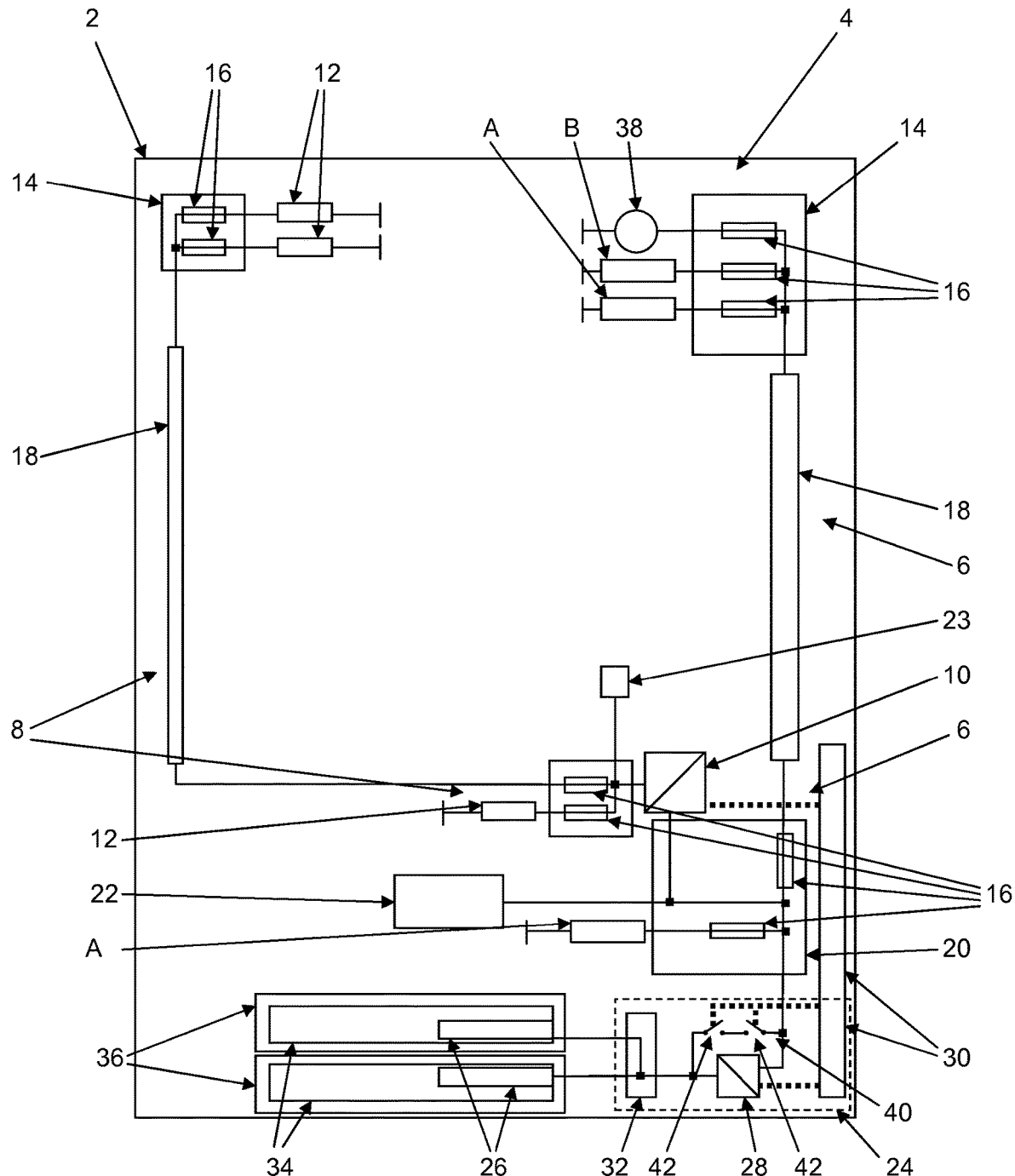
FIG. 2 is a block circuit diagram of a second embodiment of the motor vehicle with the bidirectional interface for the device rechargeable battery.

A further exemplary embodiment is represented in FIG. 2, wherein this differs from the exemplary embodiment according to FIG. 1 in respect of the configuration of the electrical or electronic coupling element. The latter is provided in the exemplary embodiment according to FIG. 2 by means of a circuit in which a bypass 40 is added to the interface converter 28. This bypass 40 is embodied by two semiconductor switches 42 which can be actuated and can be connected in antiserial fashion and via which the interface converter 28 can be bypassed.

The semiconductor switches 42 are preferably actuated here by means of the control unit 30 and typically as a function of the operating situation and/or as a function of the difference in potential between the two partial systems which are connected to one another via the electrical or electronic coupling element. If the switching also occurs, or solely occurs, as a function of the difference in potential, the difference is, for example, sensed as a voltage across the bypass 40 when the semiconductor switches 42 are opened, or as a difference in potential across the direct voltage converter, that is to say here the interface converter 28. If then, for example in the case of a provided onboard electrical system voltage of 48 V, the sensed voltage or difference in potential is higher than 2 V, the semiconductor switches 42 remain in the opened state or they are changed into the opened state, so that no current can flow across the bypass 40. If the sensed voltage or difference in potential is, on the other hand, lower than 2 V, the semiconductor switches 42 remain in the closed state or the semiconductor switches 42 are changed into the closed state, so that the current flows essentially across the bypass 40.

The voltage across the bypass 40 when the semiconductor switches 42 are opened and/or the difference in potential across the direct voltage converter, that is to say here the interface converter 28, is also preferably sensed by a measuring device, which is not illustrated or is integrated into the control unit 30, and said voltage converter is made available as information to the control unit.

The invention is not limited to the exemplary embodiment described above. Instead, other variants of the invention can also be derived herefrom by a person skilled in the art without departing from the subject matter of the invention. In particular, in addition all the individual features which are described in conjunction with the exemplary embodiment can also be combined in another way without departing from the subject matter of the invention.

The invention claimed is:

1. A motor vehicle, comprising:
an onboard electrical system having a plurality of electrical consumers, a generator and an onboard electrical system rechargeable battery; and
a bidirectional interface for connecting to a device rechargeable battery of a secondary vehicle having an electric motor such that the device rechargeable battery being coupled to said onboard electrical system via said bidirectional interface, via a plug-type connector or in a contactless fashion, and in a coupled state the device rechargeable battery being charged by said onboard electrical system and, the device rechargeable battery being available as an additional energy source for said onboard electrical system, the secondary vehicle being a last-mile vehicle and the motor vehicle being configured to accommodate or carry the secondary vehicle, wherein said onboard electrical system is configured in such a way that the device rechargeable battery can be coupled to the onboard electrical system via the bidirectional interface and in the coupled state the device rechargeable battery can be used in addition to the onboard electrical system rechargeable battery as an additional energy source in the onboard electrical system, such that in some operating states the onboard electrical system rechargeable battery and the device rechargeable battery are used in parallel at the same time.

2. The motor vehicle according to claim 1, further comprising a specific receptacle for receiving the device rechargeable battery of the secondary vehicle and/or the secondary vehicle.

3. The motor vehicle according to claim 1, wherein said bidirectional interface has an electrical or electronic coupling element, which has a direct voltage converter and a bypass circuit which is connected in parallel with said direct voltage converter.

4. The motor vehicle according to claim 3, wherein said onboard electrical system has a controller configured to control currents across said bidirectional interface into and out of coupled device rechargeable batteries, specifically in dependence on an electrical power level which is to be transmitted via said bidirectional interface.

5. The motor vehicle according to claim 4, wherein said controller is configured to actuate said electrical or electronic coupling element in such a way that electrical power to be transmitted is mainly transmitted via said direct voltage converter when the electrical power to be transmitted is lower than 1 kW, and mainly via said bypass circuit which is connected in parallel with said direct voltage converter when the electrical power to be transmitted is higher than 1 kW.

6. The motor vehicle according to claim 3, wherein said direct voltage converter and said bypass circuit is connected in parallel with said direct voltage converter are configured for different current-carrying loads.

7. The motor vehicle according to claim 1, wherein said bidirectional interface is configured for a plurality of device rechargeable batteries.

8. The motor vehicle according to claim 1, wherein said onboard electrical system rechargeable battery and device rechargeable batteries which can be coupled by means of said bidirectional interface form a rechargeable battery system with an overall capacity, which is higher than 10 Ah.

9. The motor vehicle according to claim 8, wherein a ratio of a capacity of said onboard electrical rechargeable battery to an overall capacity of a rechargeable battery system is higher than 0.3.

10. The motor vehicle according to claim 8, wherein a ratio of a capacity of said onboard electrical rechargeable battery to an overall capacity of a rechargeable battery system is lower than 0.8.

11. The motor vehicle according to claim 1, wherein said onboard electrical system has a controller configured to detect coupled device rechargeable batteries and to control currents into and out of the coupled device rechargeable batteries, wherein, in one operating mode, electrical power is drawn from the coupled device rechargeable batteries.

12. The motor vehicle according to claim 1, wherein the motor vehicle is part of a model range of motor vehicles, wherein the motor vehicles of the model range differ in terms of capacities of installed onboard electrical system rechargeable batteries, and wherein the capacities of the installed onboard electrical system rechargeable batteries of the motor vehicles of the model range which have said bidirectional interface are reduced compared to the capacities of the installed onboard electrical system rechargeable batteries of the motor vehicles of the model range which do not have said bidirectional interface.

13. The motor vehicle according to claim 1, wherein said onboard electrical system is configured in such a way that in the coupled state the device rechargeable battery is gradually recharged in typical operating states, but is not only constantly charged but also in the meantime also repeatedly used for supplying and in the process is partially discharged again.

14. The motor vehicle according to claim 1, wherein said onboard electrical system is configured in such a way that the device rechargeable battery is used for supplying in operating states of the motor vehicle in which there are brief power peaks, so that the power peaks are then distributed among a plurality of rechargeable batteries.

15. The motor vehicle according to claim 14, wherein said operating states are boosting or recuperation during which said power peaks are generated.

16. The motor vehicle according to claim 1, wherein said onboard electrical system is configured in such a way that the device rechargeable battery is no longer used for supplying, if it can be predicted that the secondary vehicle will be used shortly, but it is subsequently charged up to its maximum voltage.

17. The motor vehicle according to claim 3, wherein said onboard electrical system is configured in such a way that the bypass is used in case of balanced states of charge between the charge of the onboard electrical system rechargeable battery and the charge of the device rechargeable battery.

18. The motor vehicle according to claim 3, wherein said onboard electrical system is configured in such a way that the state of the bypass is changed between an opened state and a closed state dependent on a difference in potential across the direct voltage converter.

19. A motor vehicle system, comprising:
a first motor vehicle containing an onboard electrical system having a plurality of electrical consumers, a generator and an onboard electrical system rechargeable battery;
a secondary vehicle having an electric motor and a device rechargeable battery, said secondary vehicle being a last-mile vehicle and being accommodated in or carried by said first motor vehicle; and
said first motor vehicle having a bidirectional interface for connecting to said device rechargeable battery of said secondary vehicle such that said device rechargeable battery being coupled to said onboard electrical system via said bidirectional interface, via a plug-type connector or in a contactless fashion, and in a coupled state said device rechargeable battery being charged by said onboard electrical system and, said device rechargeable battery being available as an additional energy source for said onboard electrical system, wherein said onboard electrical system is configured in such a way that the device rechargeable battery can be coupled to the onboard electrical system via the bidirectional interface and in the coupled state the device rechargeable battery can be used in addition to the onboard electrical system rechargeable battery as an additional energy source in the onboard electrical system, such that in some operating states the onboard electrical system rechargeable battery and the device rechargeable battery are used in parallel at the same time.

20. The motor vehicle system according to claim 19, wherein said first motor vehicle is a passenger car and said last mile vehicle is a single-person vehicle selected from the group consisting of an electric longboard, a kickboard, a scooter, an electric scooter, a pedal scooter, a folding mini-scooter, a pedal electric bike and an electric bike.

* * * * *